Dec. 6, 1932.  H. P. PARIS  1,890,002
BAFFLE PLATE ARRANGEMENT AND DESIGN FOR CONCRETE MIXERS
Filed Nov. 1, 1927
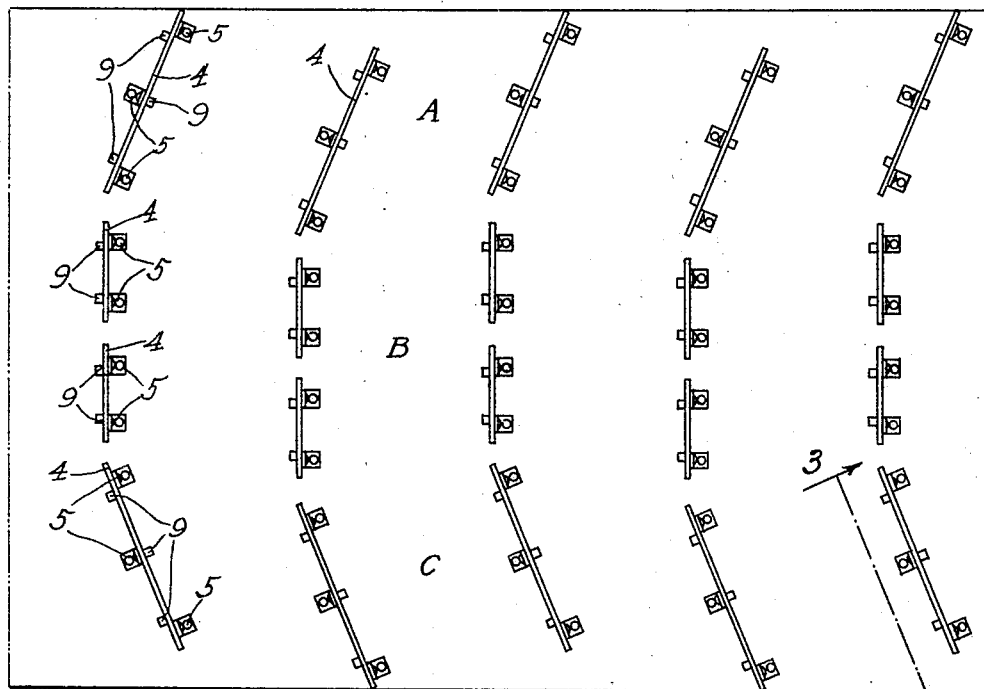
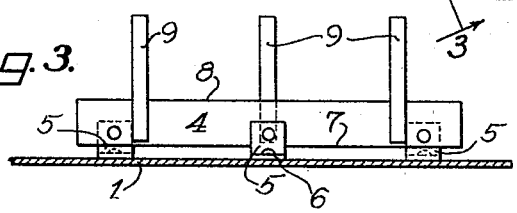
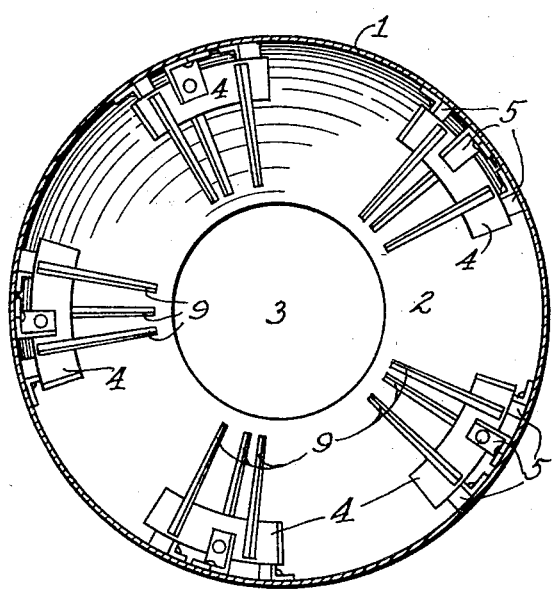
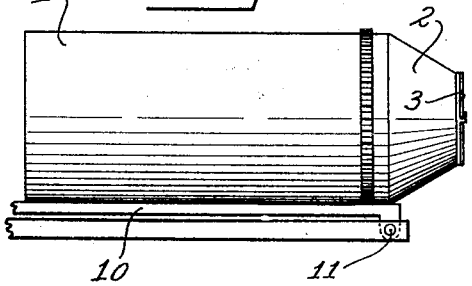
INVENTOR.
Hugh P. Paris.
BY
Harry A. Toltin
ATTORNEY.

Patented Dec. 6, 1932

1,890,002

UNITED STATES PATENT OFFICE

HUGH P. PARIS, OF NEAR KIRKLAND, KING COUNTY, WASHINGTON, ASSIGNOR TO PARIS TRANSIT MIXER COMPANY, OF SEATTLE, WASHINGTON, A CORPORATION OF WASHINGTON

BAFFLE PLATE ARRANGEMENT AND DESIGN FOR CONCRETE MIXERS

Application filed November 1, 1927. Serial No. 230,236.

The present invention relates to mixing apparatus and more particularly to the interior construction of a rotatable mixing drum or shell designed for receiving and intermixing the aggregate, forming a concrete mixture. The invention also relates particularly to a type of mixing cylinder shell or drum, the length of which is preferably greater than its diameter, and which is adapted for disposing at an incline, when it is desired to dump the contents therefrom.

The principal object of the invention is to provide in an elongated rotary mixing shell, an arrangement of mixing blades which in their mixing action cause the aggregate to be conveyed from the ends to the transverse center of the shell. Another object is to provide mixing blades on the interior of the shell, arranged in such manner that the aggregate during the mixing operation is precluded from falling perpendicularly to the same point from which it was raised. Another object is to provide mixing blades arranged in groups on the interior of the mixing shell, in such manner that the free passage of the aggregate between the ends of the blades for the full circumference of the shell is precluded.

Other objects are to provide a mounting for the mixer blades wherein the inner edges of the same are held in spaced relation from the inner wall surface of the mixing shell, admitting of the passage of a portion of the aggregate between the shell surface, and facilitating the cleaning of the shell when it is desired to wash the adhering particles from the interior wall surface thereof; to provide on the interior of the shell breaker bars projecting beyond the edges of the blades whereby collected masses of aggregate are broken up on striking the same, thereby insuring the separation into small particles of large lumps or bodies of aggregate which may collect in the shell prior to the complete mixing of the aggregate into a wetted homogeneous mass.

With the above mentioned and other objects in view, the invention consists in the novel construction and combination of parts hereinafter described, illustrated in the accompanying drawing and pointed out in the claims hereto appended; it being understood that various changes in the form, proportion, size and minor details of construction within the scope of the claims may be resorted to without departing from the spirit or sacrificing any of the advantages of the invention.

In the drawing illustrating one embodiment of my invention—

Fig. 1 is a view in plan of the inner surface of the mixer shell as it would appear cut longitudinally and rolled flat; disclosing particularly the position and arrangement of the mixing blades and the relative position of the breaker bars.

Fig. 2 is a transverse sectional view through the mixer shell, looking toward the discharge opening therein.

Fig. 3 is a sectional view on line 3—3 of Fig. 1, illustrating the mounting of one of the mixing blades and the relation of the breaker bars thereto.

Fig. 4 is a view in elevation of the mixer shell, illustrating its conical discharge and its parallel walls.

In the drawing, wherein like characters of reference designate corresponding parts,—

I indicates a mixer shell of elongated cylindrical structure, the walls of the shell being disposed in parallel relation, and one end of the shell terminating in a conical portion 2, the apex of which is cut off, affording a discharge opening 3.

On its interior, the mixer shell is provided with a plural series or groups of mixing blades, each consisting of a blade member 4, from the inner edge of which projects an angular attaching bracket 5, the foot of which is secured at 6 to the inner wall surface of the mixer shell, positioning the inner edge 7 of the blade in spaced relation to the inner wall surface of the shell.

Projecting beyond the outer edge 8 of the respective blades 4, and preferably positioned one opposite each of the attaching brackets 5, is a breaker bar 9 of any desirable length or cross-sectional configuration.

Baffle plates are arranged in three groups circumferentially of the inner wall surface of the mixer shell; group A disposed near the discharge opening 3 being arranged in parallel relation, obliquely to the axis of rotation of the shell, with their ends in staggered relation. Group B, consisting of blades of shorter length than those in group A, are disposed in parallel spaced relation parallel to the axis of rotation of the drum. The third group or series C consists of parallel spaced baffle plates disposed obliquely to the axis of rotation of the mixer shell, but in the opposite direction to the blades of group A.

Thus it will be observed that groups A and C direct the material or aggregate from the ends of the mixer shell toward the center, and group B agitates and thoroughly mixes the aggregate, it being apparent that the crown of the pile of material in the mixer shell slopes toward the mixer blades, groups A and C.

This arrangement of blades in the three groups, two directing the material toward the center of the drum, affords in a parallel walled cylindrical drum or mixer shell of a length greater than its diameter, the mixing action of a shovel crew, which removes the material from the edge of the pile and conveys it toward the center.

The breaker bars associated with each mixing blade of the series—A, B and C—break up any tendency of the aggregate to collect in lumps or balls during the mixing operation.

The arrangement of the mixing blades in their respective series as illustrated and described, insures a uniform homogeneous intermixing of the aggregate in the elongated cylinder, and at the same time afford but little obstruction to the discharge of the mixed aggregate from the discharge opening 3 when the shell is disposed in its inclined dumping position—Fig. 4.

As illustrated in Fig. 4, the mixing shell is carried by a sub-frame 10, the latter being fulcrumed at 11 to the chassis of a motor truck or other vehicle. This mounting admits of the inclined positioning of the shell when it is desired to discharge the mix therefrom.

While the breaker bars 9 are illustrated as being welded to the mixing blades 4, it is to be understood that they may be mounted in any manner, and it is also to be understood that the supporting means for the blades may be integral therewith or separate parts, as illustrated.

I claim:—

1. The combination with a rotative mixer shell, of baffles therein angularly disposed relative to the direction of rotation of said shell, to intercept and lift the materials therein, and spikes projecting beyond the edges of said baffles.

2. The combination with a rotative mixer shell, of material mixing members comprising baffles adjacent the walls of the shell and disposed angularly relative to the direction of the shell's rotation, and spikes projecting beyond the inner edges of said baffles to prick and break up mass formations.

3. The combination with a rotative cylindrical mixer shell, of baffles therein angularly disposed relative to the direction of rotation of said shell, and having their outer edges spaced from the shell walls, and spikes secured on said baffles and projecting radially inward therefrom.

4. The combination with a rotative concrete mixer shell, of spikes therein projecting inwardly towards its axis, and having their inner ends located substantially at the load level therein.

5. The combination with a rotative mixer shell of a plurality of baffles arranged in circular series, the several series being spaced longitudinally of the shell, adjacent baffles in adjoining series being staggered to alternately permit free passage of materials therebetween, upon rotation of the shell, and interception of such materials.

In testimony whereof I have signed my name to this specification.

HUGH P. PARIS.